H. Branch,
Cutting Veneers.
N° 1,142.    Patented May 3, 1839.
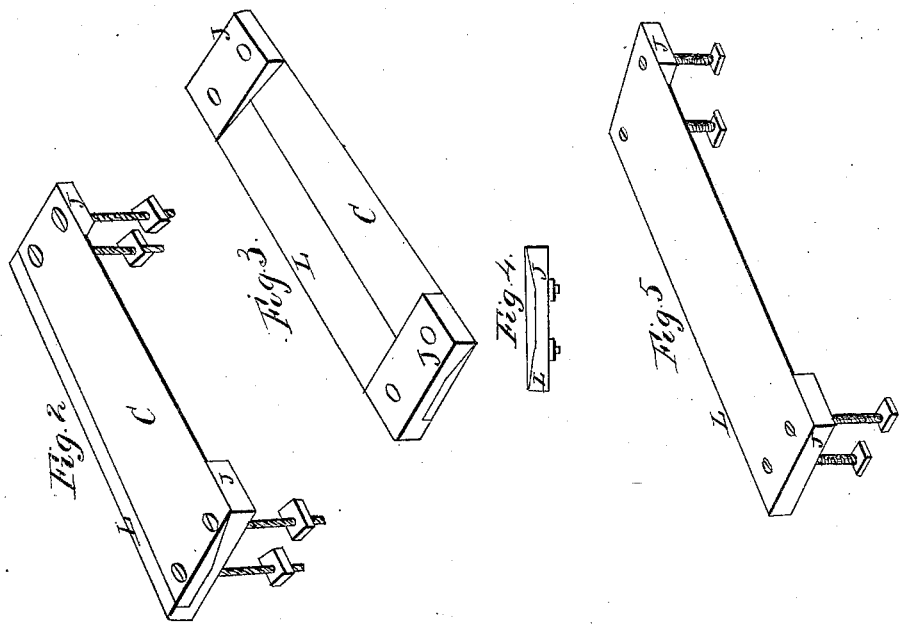
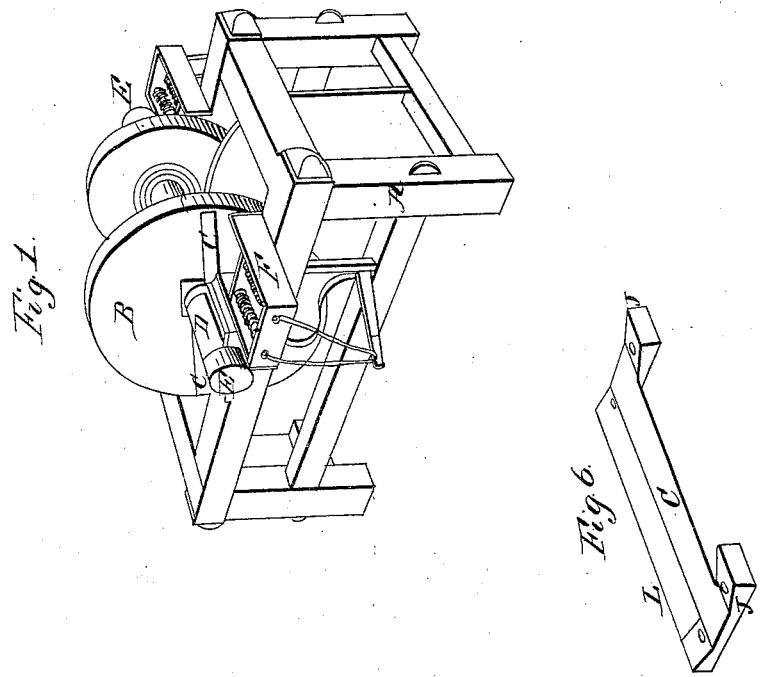

UNITED STATES PATENT OFFICE.

HARDIN BRANCH, OF NEW YORK, N. Y.

MACHINE FOR CUTTING STAVES, BLIND-SLATS, LATHS, &c., FROM SOLID BLOCKS OR BOLTS.

Specification of Letters Patent No. 1,142, dated May 3, 1839.

*To all whom it may concern:*

Be it known that I, HARDIN BRANCH, of the city, county, and State of New York, have invented a new and useful Improvement in Machines for Cutting Thin Pieces of Wood, Such as Staves, Blinds, Laths, &c., from Blocks or Bolts, which improvement is described as follows, reference being had to the annexed drawings of the same, making part of this specification.

Figure 1 represents a perspective view of a machine for cutting shingles, heading, &c., showing the position of the knives on the side of the revolving wheel. Fig. 2 represents the outer side of a stock for a knife with one cutting edge—the knife being in its proper place. Fig. 3 represents the inner side of the same stock. Fig. 4 represents an end view of a stock for a double edged knife—the knife being in place. Fig. 5 a perspective view of ditto. Fig. 6 a perspective view of ditto detached from the knife.

The frame A, Fig. 1, of this machine for containing and supporting the several parts, is made rectangular, of sufficient size and strength for the purpose intended, and the revolving wheels B, B, to which the cutting tools C are fixed, are made of suitable diameter and thickness, and the shaft D, on which said wheels are fixed, and which turns in boxes on the top of the frame is of sufficient length to project beyond the sides of the frame to receive pulleys E fixed on the ends thereof, around which bands are passed leading from the driving power, and the hopper F, in which the block or bolt is placed from which the thin pieces are to be cut, is fixed on top of frame opposite the face of the wheel where the cutting tools are placed, and the follower G moving therein for pushing the bolts toward the tools, is moved by means of spiral springs H, or screws, or in any of the well known modes, there being a hopper with its appendages for each wheel, as seen at F, F.

The cutting tools are fastened in cast iron stocks L, Figs. 2, 3, 4, 5, 6, placed and secured in countersinks in the face of the wheel. Each of these stocks consists of a casting L, made (on the back) the length of the tool, half its width, and about twice its thickness, having the ends, J, turned at right angles, and extended to the position in which it is intended to place the cutting edge of the knife, forming a flange J, the upper side of said stock being concave of a corresponding shape to the side of the cutting tool toward the wheel which is placed therein, secured by screws passing through the cutting tool into corresponding female screws in the stock, four of which, or those at the ends, being made long enough to extend through the wheel, and to receive nuts, or taps.

The under side of the long straight part of the stock is sloped or beveled to correspond with the bevel of the cutting tool. Openings are made in the wheels, behind the cutting tools through which the pieces cut are discharged. The cutting tools are to be made of various sizes and shapes, with one, or two cutting edges, crowning, or straight, according to the kind of stuff to be cut, the depressions in the stock being made of corresponding shape. The stock for a double edged knife is made as represented at Figs. 4 and 5.

There may be one or two wheels of cutting tools on the same shaft.

The operation of the machine is similar to other machines for cutting thin pieces of wood, &c.

Having given a description of the machine to which I apply my invention, I do hereby declare that I do not claim any part of said machine as my invention, but

What is claimed as new and desired to be secured by Letters Patent consists,

In the employment of the cast iron stock, constructed as herein described for holding and securing the cutting tools to the wheel for cutting thin pieces of wood from solid blocks, as herein described.

HARDIN BRANCH.

Witnesses:
N. BENEDICT,
C. H. WILTBERGER.